March 6, 1934.　　　　C. M. STEIN　　　　1,950,069
APPARATUS FOR THE REMOVAL OF SOLID SUBSTANCES
IN SUSPENSION IN A CURRENT OF GAS
Filed June 11, 1931

Inventor
Charles M. Stein
By c. A. m. Burns
atty

Patented Mar. 6, 1934

1,950,069

UNITED STATES PATENT OFFICE 1,950,069

APPARATUS FOR THE REMOVAL OF SOLID SUBSTANCES IN SUSPENSION IN A CURRENT OF GAS

Charles M. Stein, Paris, France, assignor to Société Anonyme: Fours et Appareils Stein, Paris, France, a corporation of France Application June 11, 1931, Serial No. 543,718
In France June 23, 1930

3 Claims. (Cl. 209—139)

The present invention relates to an apparatus for the removal of the excessively large particles of a solid substance, in the powdered state, which is in suspension in a stream of gas, the size of the particles removed by the apparatus, and hence the fineness of the substance remaining in suspension in the conveying fluid, being regulated by simple means.

The following description, with reference to the accompanying drawing which is given by way of example, relates to an embodiment of the invention.

Figure 1:
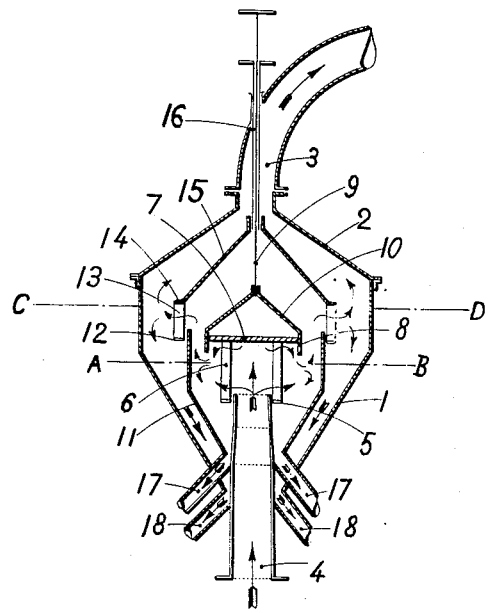
Fig. 1 is a vertical section on the axis of the apparatus.
Figure 2:
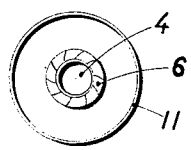
Fig. 2 is a horizontal section on the line A—B of Figure 1.
Figure 3:
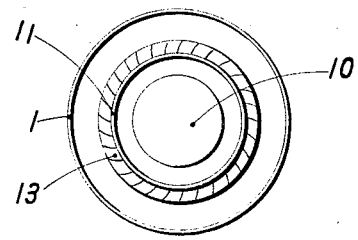
Fig. 3 is a horizontal section on the line C—D of Figure 1.

The apparatus consists essentially of a main body 1, represented by a revolution about its vertical axis, and comprising an upper cylindrical part having at the bottom a tapered portion coaxial therewith. At the upper part 2 of the said main body is connected a pipe 3, leading to the suction end of a blower, not shown, which serves to impart to the gas stream conveying the material in the separator and in the piping, the proper speed for the powdered substance in suspension in the gas. Into the lower part, and preferably on the axis of the main body, is inserted a pipe 4, which supplies, under pressure or by the suction of the said blower, the stream of gas charged with the solid particles, from which the apparatus is to remove those exceeding a determined size.

In the said main body, and on its vertical axis, is suspended a member having a general cylindrical shape, at whose lower part is a ring 5 mounted on the exterior of the pipe 4 and slidable thereon. A set of blades 6 having vertical generatrices and straight or curved directrices, extends from the said ring 3 to an upper circular plate 7 having on its periphery a flange 8. The cylindrical device thus formed can be moved according to the vertical axis of the apparatus, through the whole height of the blades 6, and the lowest point of its movement is attained when the deflecting plate 7 rests upon and thus closes the top of the pipe 4. The device is suspended from a rigid rod 9 extending through the suction pipe 3. Its vertical position can be determined after the apparatus has been regulated, by numerous devices of a simple nature which are outside of the invention. The tapered part 10, of which the plate 7 forms the base, serves to avoid all deposits of the powdered substance on this plate.

Surrounding the said device, or first chamber, is a cylindro-conical body 11 having the same vertical axis as the whole apparatus. The cylindrical part of said body extends above the plate 7, (when the latter is at its maximum height), thus forming between the cylindrical part of 11 and the flange 8, an annular conduit of constant section in which the speed of the fluid will become regular, thus furthering the settling of the particles of too large a size to be carried along at this speed.

Outside of the cylindrical part of 11 is suspended a secondary chamber which consists, like the first, of a guiding ring 12 coaxial with 11, a set of blades 13 having vertical generatrices, and an upper frame 14 carrying a tapered part 15 by which the fluid is guided. The whole of this secondary chamber is suspended from a tube 16 surrounding the rod 9 and extending, like this latter, from the bent suction pipe 3. By any suitable means, this tube-shaped suspension device, and with it the said secondary chamber, can be held fast at any desired point of their vertical movement.

At the lower part of the tapered portion of the outer main body 1, and of the internal body 11, are mounted one or more tube portions 17—18 for the discharge of the waste matter, that is, the large particles retained in the separator.

The apparatus being thus constructed, the gas stream carrying the solid particles in suspension, which enters through the vertical conduit 4, proceeds into the first chamber 5; this stream is deflected by the upper plate 7 and the flange 8, and it flows through the directing blades 6 by which it is given a whirling motion, so that the large particles will be projected against the inner wall of the cylindro-conical body 11, whence they will descend to the offtake tubes 17, while the gas stream flows to the top, drawing with it the smaller particles.

Due to the suction produced by the blower, the fluid thus freed from the larger particles will be obliged to pass through the blades 13 of the secondary chamber 11; in the dust-removing chamber following the said blades, it leaves another part of the dust-like particles, that is, the particles whose weight is incompatible with the speed of removal prevailing in this chamber.

After this point, the fluid is subject only to increasing speeds, until it enters the pipe 3 which conducts it to a conveying blower.

The primary and secondary chambers, when they are raised or lowered so as to increase or reduce the flow section of the blades for the circulation of the fluid, thus changing the rate of flow of the fluid through the blades, will change at the same time the size of the particles collected in the discharge conduits, and consequently the degree of fineness of the substance removed by the suction blower.

Due to the separation of the gas stream into a great number of thin flat streams when passing through the blades, to the changes in the direction of this gas stream whose whirling motion is converted into a rising motion, and to the sudden change of speed of the small streams issuing from the said blades and thus entering the separating chambers, a very regular fineness of the substance removed from the separator will be obtained.

It will be observed that in the said apparatus, the removal of the particles which have not been sufficiently ground up, takes place in two steps.

The first step comprises only the removal of the larger grains, and this may take place at relatively high speeds, and hence without any great loss of the fine substance.

It follows that in the second step, in which the final handling of the substance is effected at slow speed, such large particles will not be allowed to draw any great amount of the fine substance towards the discharge conduits used for the waste material.

In this manner, the separation into two steps constitutes a great improvement in the yield of apparatus adapted for the subdivision of substances by the use of air.

I claim

1. In a separator for removing particles suspended in gases, a vertical inlet conduit having its outlet into the separator at its upper end, a vertically adjustable bell over the upper outlet end of said inlet conduit and having vertical openings through its side walls, a cylindrical separating chamber surrounding said inlet conduit and bell and extending upwardly above the upper limits of the openings in said bell, a second bell vertically adjustable over the upper end of said cylindrical separating chamber and having vertical openings through its side walls, a second cylindrical separating chamber surrounding said second bell and the first separating chamber, said separator chambers having off-take outlets for precipitated particles below said bells, and said second separating chamber having an outlet conduit for gases above said bells.

2. A separator for removing particles suspended in gases in accordance with claim 1, in which the vertical openings through each bell consist of blades having an oblique direction in which they impart to the gas stream a movement of rotation about the axis of the chambers of separation.

3. A separator for removing particles suspended in gases in accordance with claim 1 in which the bells, separating chambers and gas inlet and outlet conduits of the separator are arranged concentrically about a vertical axis.

CHARLES M. STEIN.